012# United States Patent

[11] 3,624,199

[72] Inventors James Norfleet
506 Lee Pl., Plainfield, N.J. 07063;
Francis D. Roberts, 22 Crest Drive, W.
Millington, N.J. 07946
[21] Appl. No. 818,047
[22] Filed Apr. 21, 1969
[45] Patented Nov. 30, 1971

[54] DENTAL CREAM
9 Claims, No Drawings
[52] U.S. Cl. .................................................... 424/57
[51] Int. Cl. ..................................................... A61k 7/16
[50] Field of Search ........................................ 424/49–58

[56] References Cited
UNITED STATES PATENTS
3,095,356  6/1963  Moss ............................. 424/51
3,227,618  1/1966  Manahan et al. ............. 424/52

OTHER REFERENCES

The Dispensatory of the United States of America, 25th ed., published by J. B. Lippincott Co., Phila., 1955, page 159 copy in Group 120

*Primary Examiner*—Richard L. Huff
*Attorneys*—Herbert S. Sylvester, Murray M. Grill, Norman Blumenkopf, Ronald S. Cornell, Thomas J. Corum, Richard N. Miller and Robert L. Stone ABSTRACT: Dental cream containing hydrated alumina, calcium carbonate or insoluble alkali metal metaphosphate as polishing agent, benzyl alcohol as desensitizing agent and zinc oxide. The cream does not swell or corrode unlined aluminum tubes when incorporated therein.

DENTAL CREAM

This invention relates to a dental cream composition. More particularly it relates to a dental cream, having a desensitizing effect on the gums, which may be economically placed in unlined aluminum tubes from which it can be extruded without undesirable swelling or corrosion of the tube.

It has been desired to use unlined aluminum tubes for dental creams particularly in view of the economy in use of such tubes and their lightweight. However, certain problems have been present when unlined aluminum tubes have been used for dental creams in view of noncompatibility between the aluminum surface and components of dental creams. Thus, dental creams which contain a polishing material including a major amount of at least one of hydrated alumina, calcium carbonate and insoluble alkali metal metaphosphate, and benzyl alcohol, an agent which has a mild-desensitizing effect on the gums may be difficult to extrude due to tube swelling or substantial undesirable corrosion (or coloration) may occur at points of contact between the cream and the tube.

It is an object of this invention to provide a dental cream containing a polishing material including a major amount of at least one of hydrated alumina, calcium carbonate and insoluble alkali metal metaphosphate, and benzyl alcohol which is storage stable upon incorporation in unlined aluminum tubes and particularly does not cause substantial tube swelling or corrosion.

Other objects will be apparent from consideration of the following disclosure.

In accordance with certain of its aspects, this invention relates to a dental cream comprising about 20–75 percent by weight of a water-insoluble polishing material having as its major component at least one of an agent selected from the group consisting of hydrated alumina, calcium carbonate and insoluble alkali metal metaphosphate, about 0.5–10 percent by weight of benzyl alcohol and about 0.15–2 percent by weight of zinc oxide.

The instant composition normally has a pH between about 3.5 and 10 and preferably on the order of about 6–9 and most preferably about 6.5. Suitably a buffering system may be employed to assure maintenance of a pH within the aforesaid range in order to insure against a reduction in activity of the composition which occurs under more alkaline or acidic conditions.

The water-insoluble polishing material of the instant invention contains a major proportion (that is, at least 50 percent to 100 percent by weight of the polishing material) of hydrated alumina, calcium carbonate or insoluble alkali metal metaphosphate.

The hydrated alumina which may be employed in the instant invention is classified as Gibbsite and may be represented chemically as $Al_2O_3 \cdot 3H_2O$ or $Al(OH)_3$. Its average particle size is about 6–9 microns. A typical particle size distribution is as follows:

| | |
|---|---|
| Less than 30 microns | 94–99 percent |
| Less than 20 microns | 85–93 percent |
| Less than 10 microns | 56–67 percent |
| Less than 5 microns | 28–40 percent |

Other types of hydrated alumina may also be used.

The calcium carbonate which may be used in the instant invention is typically employed in powder form of about 1 to 10 microns. It is preferred to use a grade of calcium carbonate of apparent specific gravity, say about 0.7–1.2. "Apparent specific gravity" refers to the untamped specific gravity of the salt.

The insoluble alkali metal metaphosphates which may be used in the instant invention are preferably the insoluble sodium and potassium salts of polymetaphosphoric acid. These materials are known in the art. The insoluble sodium metaphosphate is preferred. Such materials may be formed in any suitable manner, as illustrated by Thorpe's Dictionary of Applied Chemistry, vol. 9 (4th ed.), pp. 510–511. The forms of insoluble sodium metaphosphate known as Madrell's salt and Kurrol's salt are further examples of suitable materials. These metaphosphate salts exhibit only a minute solubility in water, and are commonly referred to as insoluble metaphosphates therefore. There is present a minor amount of soluble phosphate material as impurities, usually of the order of a few percent such as up to about 4 percent by weight. The amount of soluble phosphate material which is believed to be a soluble sodium trimetaphosphate in the case of insoluble sodium metaphosphate may be reduced by washing with water if desired. The insoluble alkali metal metaphosphate is typically employed in powder form of a size such that no more than about 1 percent of the material is larger than about 37 microns.

The polishing material may contain 100 percent of any of hydrated alumina, calcium carbonate or insoluble alkali metal metaphosphate or any of these agents in major amount in admixture with a minor amount of one or both of the other agents or polishing agents such as dicalcium phosphate, tricalcium phosphate, calcium pyrophosphate, calcium sulfate, etc.

The polishing material content of the dental cream is variable, but will generally be about 20–75 percent by weight of the total composition.

The dental creams of the instant invention contain about 0.5–10 percent by weight, preferably about 0.75–3.5 percent, and most preferably about 1.0–2.0 percent benzyl alcohol which has a desensitizing effect on tender areas and membranes in the oral cavity. The effect of benzyl alcohol may be supplemented with about 0.3–3 percent by weight of the dental cream of Benzocaine, ethyl p-amino benzoate.

In the dental cream formulation, liquids and solids are proportioned to form a creamy mass of desired consistency. In accordance with certain aspects of this invention, the creamy mass is packaged in a collapsible unlined aluminum tube.

In general, the liquids in the dental cream will comprise chiefly water, glycerine, aqueous solutions of sorbitol, propylene glycol, polyethylene glycol 400, etc., including suitable mixtures thereof. It is advantageous usually to use a mixture of both water and a humectant or binder such as glycerine or sorbitol. The total liquid content will generally be about 20–75 percent by weight of the formulation. It is preferred to use also a gelling agent in dental creams such as the natural and synthetic gums and gumlike materials, e.g., Irish moss, gum tragacanth, sodium carboxymethyl cellulose, polyvinylpyrrolidone, starch and the like, usually in an amount up to about 10 percent, and preferably about 0.2–5 percent of the formulation. When an astringent is employed, the preferred gum is Irish moss.

Organic surface-active agents used in the compositions of the present invention may coact with the antimicrobial agent to achieve increased prophylactic action, assist in achieving thorough and complete dispersion of the instant compositions throughout the oral cavity, and render the instant compositions more cosmetically acceptable. The organic surface active material may be anionic, nonionic, ampholytic, or cationic in nature, and it is preferred to employ as the surface active agent a detersive material which imparts to the composition detersive and foaming properties. Suitable such detergents are water-soluble salts of higher fatty acid monoglyceride monosulfates, such as the sodium salt of the monsulfated monoglyceride of hydrogenated coconut oil fatty acids, higher alkyl sulfates, such as sodium lauryl sulfate, alkyl aryl sulfonates, such as odium dodecyl benzene sulfonate, higher alkyl sufcoacetates, higher fatty acid ester of 1,2 dihydroxy propane sulfonates, and the substantially saturated higher aliphatic acyl amides of lower aliphatic amino carboxylic acid compounds, such as those having 12 to 16 carbons in the fatty acid, alkyl or acyl radicals, and the like. Examples of the last-mentioned amides are N-lauroyl sarcosine, and the sodium, potassium, and ethanolamine salts of N-lauroyl, N-myristoyl or N-palmitoyl sarcosinates, which should be substantially free from soap or similar higher fatty acid material which tends to substantially reduce the effect of these compounds. The use of these sarcosinate compounds in dentifrice compositions of the present invention is particularly advantageous since these materials exhibit a prolonged and marked effect in the inhibition of acid in the oral cavity due to carbohydrates, in addition to exerting some reduction in the solubility of tooth enamel in acid solutions.

Other suitable surface active materials include nonionic agents such as condensates of sorbitan monostearate with approximately 60 moles of ethylene oxide, condensates of ethylene oxide with propylene oxide condensates of propylene glycol ("Pluronics") and cationic surface active germicides and antibacterial compounds such as di-isobutylphenoxyethyl dimethyl benzyl ammonium chloride, benzyl dimethyl stearyl ammonium chloride, tertiary amines having one fatty alkyl group (of from 12 to 18 carbon atoms) and two (poly)oxyethylene groups attached to the nitrogen (typically containing a total of from about 2 to 50 ethenoxy groups per molecule) and salts thereof with acids, and compounds of the structure

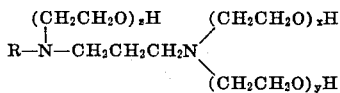

where R is a fatty alkyl group containing from about 12 to 18 carbon atoms, and $x$, $y$, and $z$ total 3 or higher, as well as salts thereof with mineral or organic acids.

It is preferred to use from about 0.05 to 5 percent by weight of the foregoing surface-active materials in the instant dental cream.

Various other materials may be incorporated in the dental creams of this invention. Examples thereof are coloring or whitening agents, preservatives, silicones, chlorophyll compounds, ammoniated materials such as urea, diammoniumphosphate and mixtures thereof, and other constituents. These adjuvants are incorporated in the instant compositions in amounts which do not substantially adversely affect the properties and characteristics suitably selected and used in proper amount depending upon the particular type of preparation involved.

Antibacterial agents may also be employed in the dental creams of the instant invention. Typical antibacterial agents include $N^1$-(4-chlorobenzyl-$N^5$-(2,4-dichlorobenzyl) biguanide;
p-chlorophenyl biguanide;
4-chlorobenzhydryl biguanide;
4-chlorobenzhydrylguanylurea;
N-3-lauroxypropyl-$N^5$-p-chlorobenzylbiguanide;
1,6-di-p-chlorophenylbiguanidohexane;
1-(lauryldimethylammonium)-8-(p-chlorobenzyldimethylammonium) octane dichloride;
5,6-dichloro-2-guanidinobenzimidazole; $N^1$-p-chlorphenyl-$N^5$-laurylbiguanide;
5-amino-1,3-bis(2-ethylhexyl)-5-methylhexahydropyrimidine;
and their nontoxic acid addition salts.

The antibacterial agent, when present, is employed in amounts of about 0.01–5 percent by weight, preferably about 0.05–5 percent.

In accordance with this invention, it has been found that the presence of zinc oxide permits dental creams containing benzyl alcohol in which the polishing material contains a major amount of any of hydrated alumina, calcium carbonate or insoluble alkali metal metaphosphate to be placed in unlined aluminum tubes without substantial tube swelling or substantial tube corrosion occurring. The zinc oxide is present in amount of about 0.15–2 percent by weight of the total composition and preferably about 0.5–1 percent.

When the polishing material contains a major amount of hydrated alumina, it is particularly desirable to also include an astringent, such as zinc sulfate, zinc chloride, aluminum chloride and the like, in the cream. Typically, the astringent is present in amount of 0.25–3 percent, by weight, preferably 0.5–1 percent. The astringent may also be employed with polishing materials other than hydrated alumina, such as calcium carbonate.

Any suitable flavoring or sweetening sialagogue may be employed in formulating the dental cream of the instant invention. Examples of suitable examples of flavoring constituents include flavoring oils such as oils of spearmint, peppermint, clove, wintergreen, sassafras, sage, eucalyptus, marjoram, cinnamon, lemon and orange, as well as sodium salicylate. Suitable sweetening agents include sucrose, lactose, maltose, sorbitol, sodium cyclamate and saccharine. Suitably, the total amount of sialagogue may comprise about 0.5–6 or more of the dental cream of the instant invention.

The compositions of the present invention suitably may also contain a fluorine-containing compound having a beneficial effect on the care and hygiene of the oral cavity, e.g., diminution of enamel solubility in acid and protection of the teeth against decay. Examples thereof include sodium fluoride, stannous fluoride, potassium fluoride, potassium stannous fluoride ($SnF_2 \cdot KF$), sodium hexafluorostannate, stannous chlorofluoride, sodium fluorozirconate, and sodium monofluorophosphate. These materials, which dissociate or release fluorine-containing ions in water, suitably may be present in an effective but nontoxic amount, usually within the range of about 0.01 to 1 percent by weight of the water soluble fluorine content thereof.

The following specific examples are further illustrative of the nature of the present invention but it is to be understood that the invention is not limited thereto. All amounts and proportions are by weight unless otherwise indicated.

EXAMPLE 1

The following creams are prepared:

|  | A Parts | B Parts | C Parts |
|---|---|---|---|
| Glycerine | 22.0 | 22.0 | 22.0 |
| Irish Moss | 1.0 | 1.0 | 1.0 |
| Sodium Benzoate | 0.5 | 0.5 | 0.5 |
| Sodium Saccharine | 0.2 | 0.2 | 0.2 |
| Water (Distilled) | 16.5 | 19.0 | 19.0 |
| Zinc Sulfate | 0.6 | 0.6 | 0.6 |
| Sodium Lauryl Sulfate | 1.5 | 1.5 | 1.5 |
| Zinc Oxide | 1.0 | 0.5 | — |
| Hydrated Alumina | 52.0 | 52.0 | 52.0 |
| Benzyl Alcohol | 3.5 | 1.5 | 1.5 |
| Flavor | 1.2 | 1.2 | 1.2 |

The creams are prepared by adding zinc oxide (in creams A and B) to gels containing glycerine, Irish moss, sodium benzoate, sodium saccharine, water, zinc sulfate and sodium lauryl sulfate. The polishing material (hydrated alumina) is then added to form creams. Benzyl alcohol and flavor are next added.

The creams are placed in collapsible unlined aluminum tubes. After storage at 49° C. for 6 weeks the tube in which cream C is present swells and is corroded with a white layer. No such problems are present in the tubes containing creams A and B.

EXAMPLE 2

|  | D, parts | E, parts | F, parts | G, parts |
|---|---|---|---|---|
| Glycerine | 22.0 | 22.0 | 22.0 | 22.0 |
| Irish moss | 1.0 | | | 1.0 |
| Sodium carboxymethyl cellulose | | 1.0 | 1.0 | |
| Sodium benzoate | 0.5 | 0.5 | 0.5 | 0.5 |
| Sodium saccharine | 0.2 | 0.2 | 0.2 | 0.2 |
| Water | 19.6 | 15.6 | 24.6 | 24.85 |
| Sodium lauryl sulfate | 1.5 | 1.5 | 1.5 | 1.5 |
| Zinc oxide | 1.0 | 1.0 | 1.0 | 1.0 |
| Polishing material: | | | | |
| Hydrated alumina:calcium carbonate=1:9 | 52.0 | | | |
| Calcium carbonate | | 52.0 | | |
| Insoluble sodium metaphosphate | | | 47.25 | |
| Hydrated alumina:insoluble sodium metaphosphate:calcium carbonate=1:7:39.25 | | | | 47.25 |
| Benzyl alcohol | 1.0 | 5.0 | 0.75 | 0.5 |
| Flavor | 1.2 | 1.2 | 1.2 | 1.2 |

These dental creams are placed in unlined aluminum tubes. There is no substantial corrosion or tube swelling even after storage at 49° C. for several weeks. When zinc oxide is omitted from the above creams, upon storage at 49° C., within 3 weeks, the tube containing the cream having 1:9 ratio of hydrated alumina to calcium carbonate shows evidence of corrosion staining; the tube containing the cream having calcium carbonate as the polishing material shows evidence of gold colored corrosion layer; the tube containing the cream having insoluble sodium metaphosphate as the sole polishing agent shows evidence of the tube swelling and formation of a black corrosion layer; and the tube containing the cream having the hydrated alumina, insoluble sodium metaphosphate and calcium carbonate polishing material has black and gold colored corrosion stains.

It will be apparent to one skilled in the art that various modifications may be made and that equivalents can be substituted therefor.

We claim:

1. A dental cream comprising about 20–75 percent by weight of a dentally acceptable water-insoluble polishing agent having hydrated alumina as its major component, about 0.5–5 percent by weight of benzyl alcohol and about 0.15–2 percent by weight of zinc oxide.

2. The dental cream claimed in claim 1 wherein said zinc oxide is present in amount of about 0.5–1 percent.

3. The dental cream claimed in claim 1 wherein such benzyl alcohol is present in amount of about 0.75–3.5 percent.

4. A dental cream comprising about 20–52 percent by weight of a dentally acceptable water-soluble polishing agent having calcium carbonate as its major component, about 0.5–5 percent by weight of benzyl alcohol and about 0.15–2 percent by weight of zinc oxide.

5. The dental cream claimed in claim 4 wherein said polishing material is a mixture of a major amount of calcium carbonate and a minor amount of hydrated alumina.

6. The dental cream claimed in claim 4 wherein said polishing material is a mixture of a major amount of calcium carbonate and minor amounts of hydrated alumina and insoluble sodium metaphosphate.

7. The dental cream claim in claim 4 wherein said benzyl alcohol is present in amount of about 0.74–3.5 percent.

8. A packaged dental cream comprising an unlined aluminum tube having incorporated therein a dental cream comprising about 20–75 percent by weight of a dentally acceptable water-insoluble polishing agent having hydrated alumina as its major component, about 0.5–5 percent by weight of benzyl alcohol and about 0.15–2 percent by weight of zinc oxide.

9. A packaged dental cream comprising an unlined aluminum tube having incorporated therein a dental cream comprising about 20–52 percent by weight of a dentally acceptable polishing agent having calcium carbonate as its major component, about 0.5–5 percent by weight of benzyl alcohol and about 0.15–2 percent by weight of zinc oxide.

* * * * *